United States Patent Office 3,350,597
Patented Oct. 31, 1967

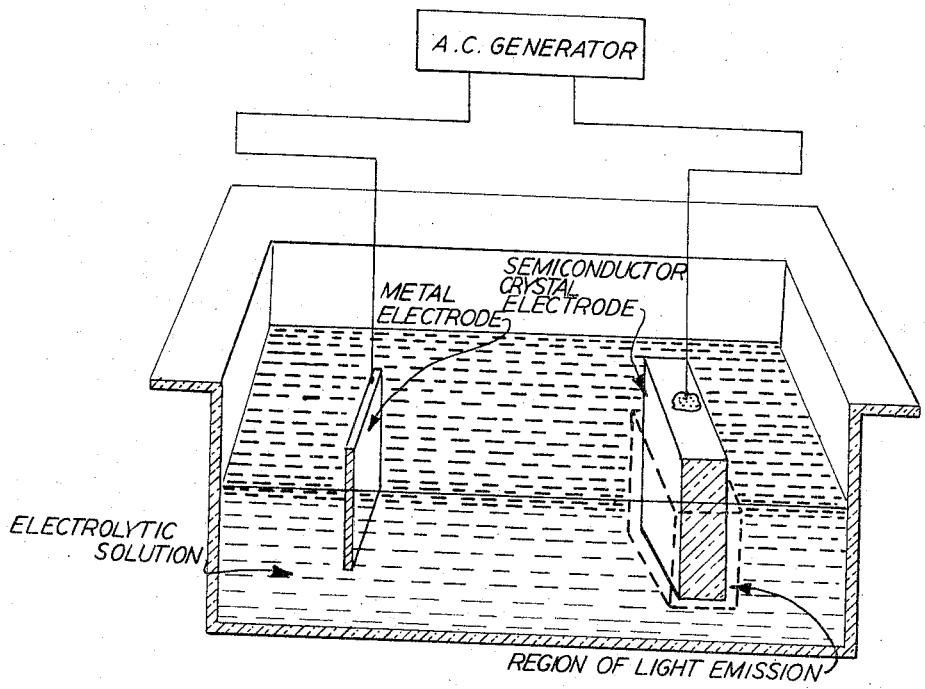
TERRY COLE
DAVID K. DONALD
JOHN J. LAMBE
WILLIAM C. VASSELL
INVENTORS

3,350,597
ELECTROLUMINESCENT PROCESS INCLUDING AN IONICALLY CONDUCTING ELECTROLYTE
Terry Cole, Dearborn, Mich., David K. Donald, Webster, N.Y., and John J. Lambe, Birmingham, and William C. Vassell, Dearborn, Mich., assignors to Ford Motor Company, Dearborn, Mich., a corporation of Delaware
Filed May 17, 1965, Ser. No. 456,475
3 Claims. (Cl. 313—108)

This invention relates to a process for the electroluminescent production of light, and more particularly with a process for the electroluminescent production of light of characteristic narrow frequency bands. This invention teaches an improvement upon the process taught in United States Letters Patent 2,254,957 issued Sept. 2, 1941, to Bay et al.

This invention teaches that electroluminescence can be produced by passing an electrical current between a semiconducting material and an ionically conducting electrolyte and that this electroluminescence will be confined to characteristic narrow spectral bands. Either direct or alternating current may be used, although alternating energy is preferred to avoid the complications involved in polarization reactions. The preferred power source is one having a peak to peak voltage of about 200 volts and a frequency of ten to sixty cycles per second.

The electrolyte used may be any ionically conducting electrolyte which will not attack the semiconductor. The preferred electrolyte is acetone containing sufficient tetra-ethyl-ammonium bromide to provide ions for conduction. A similar ionically conducting electrolyte with calcium chloride substituted for the tetra-ethyl-ammonium bromide has been successfully employed.

The semiconducting material employed has been cadmium fluoride which has been doped with rare earth compounds to raise its conductivity to about 10 ohm centimeters. The preferred rare earths are samarium, gadolinium, terbium and europium.

An electroluminescent cell was built employing a crystalline electrode of cadmium fluoride doped with samarium and immersed in acetone activated with tetra-ethyl-ammonium bromide. The size of the crystal electrode was $\frac{1}{2}"$ x $\frac{1}{4}"$ x $\frac{1}{2}"$. A metal electrode was arranged opposite the semiconductor electrode and both were immersed in the electrolyte. Visible light was observed to come from all the surfaces of the crystal which are in contact with the electrolyte. This light has a color or emission spectra characteristic of the rare earth ion embedded in the cadmium fluoride lattice. Any suitable electrode of metal may be employed opposite the semiconductor electrode. This metal electrode serves only to provide a path for the current to and from the ionically conducting electrolyte and its composition or shape is not critical. Similarly the electrolyte need not be a liquid, but may be a gel.

We claim as our invention:
1. The process of producing electroluminescence comprising passing an electrical current between an ionically conducting electrolyte and a semiconducting crystalline mass of cadmium fluoride in contact with the ionically conducting electrolyte, said semiconducting material being doped with a rare earth compound.
2. The process of producing electroluminescence comprising passing an electrical current between an ionically conducting electrolyte and a semiconducting crystalline mass of cadmium fluoride in contact with the ionically conducting electrolyte, said semiconducting material being doped with an element selected from the group consisting of samarium, gadolinium, terbium and europium.
3. The process of producing electroluminescence comprising passing an electrical current between an ionically conducting electrolyte and a semiconducting crystalline mass of cadmium fluoride in contact with the ionically conducting electrolyte, said semiconducting material being doped with a rare earth compound to exhibit a resistivity of approximately 10 ohm centimeters.

References Cited

UNITED STATES PATENTS

| 2,254,957 | 9/1941 | Bay et al. | 313—358 |
| 2,470,627 | 5/1949 | Leverenz | 252—301.6 |
| 2,676,112 | 4/1954 | Middleton et al. | 252—301.6 |
| 3,203,899 | 8/1965 | Fisher | 252—301.4 |
| 3,236,780 | 2/1966 | Ozarow | 252—301.4 |
| 3,305,486 | 2/1967 | Prenner | 313—108 |

OTHER REFERENCES

Prenner "Mechanism of the Conversion of $CdF_2$ From an Insulator to a Semiconductor," Journal of Chem. Phys., 1963, vol. 38, No. 3, pp. 667–671.

DAVID J. GALVIN, *Primary Examiner.*

JAMES W. LAWRENCE, *Examiner.*

R. JUDD, *Assistant Examiner.*